United States Patent
Yukimatsu et al.

(10) Patent No.: US 8,951,652 B2
(45) Date of Patent: Feb. 10, 2015

(54) SUBSTRATE FOR MAGNETIC RECORDING MEDIUM, MAGNETIC RECORDING MEDIUM, METHOD OF MANUFACTURING MAGNETIC RECORDING MEDIUM, AND METHOD OF INSPECTING SURFACE

(71) Applicant: Showa Denko K.K., Minato-ku, Tokyo (JP)

(72) Inventors: Koji Yukimatsu, Ichihara (JP); Yukihisa Matsumura, Ichihara (JP); Yoshihito Sueoka, Ichihara (JP); Junichi Kishimoto, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/687,446

(22) Filed: Nov. 28, 2012

(65) Prior Publication Data
US 2013/0136952 A1 May 30, 2013

(30) Foreign Application Priority Data
Nov. 30, 2011 (JP) ................................ 2011-262611

(51) Int. Cl.
*G11B 5/73* (2006.01)
*G11B 23/00* (2006.01)
(Continued)

(52) U.S. Cl.
CPC .............. *G11B 23/0028* (2013.01); *G01B 7/28* (2013.01); *G06F 15/00* (2013.01); *G01B 11/30* (2013.01); *G11B 23/0021* (2013.01); *G11B 5/7315* (2013.01); *G11B 5/8404* (2013.01)
USPC ....... 428/846.9; 428/64.2; 428/127; 428/141; 428/846; 360/135; 73/104; 73/105; 73/640; 65/64

(58) Field of Classification Search
CPC ............. G11B 23/0028; G11B 5/7315; G11B 7/2531; G01B 11/30
USPC ............. 428/800, 846.9, 64.2, 141, 836, 127, 428/846; 360/135; 73/104, 105, 640; 65/64
See application file for complete search history.

(56) References Cited

U.S. PATENT DOCUMENTS

| 2005/0074635 | A1* | 4/2005 | Mitani et al. | 428/846.9 |
| 2006/0193083 | A1* | 8/2006 | Soeno et al. | 360/135 |

(Continued)

FOREIGN PATENT DOCUMENTS

| JP | 9-152324 A | 6/1997 |
| JP | 2001-67650 A | 3/2001 |

(Continued)

*Primary Examiner* — Kevin Bernatz
(74) *Attorney, Agent, or Firm* — Sughrue Mion, PLLC

(57) ABSTRACT

A substrate for a magnetic recording medium having a disc shape with a central hole is provided in which the surface roughness of the principal surface of the substrate is 1 angstrom or less in terms of root mean square roughness (Rq) when a space period (L) of an undulation in the circumferential direction is in the range 10 to 1,000 μm, and in which when a component in the vertical axis direction of a line segment Z connecting a point A with the space period (L) of 10 μm and a point B with the space period (L) of 1,000 μm in a curve S marked on a double logarithmic graph which is obtained by analyzing the surface roughness using a spectrum and in which the horizontal axis is set to the space period (L) (μm) and the vertical axis is set to the power spectrum density (PSD) (k·angstrom$^2$·μm) (where k is a constant) is defined as H and a displacement at which the component in the vertical axis direction of the curve S is the maximum with respect to the line segment Z is defined as ΔH, a value (P) expressed by (ΔH/H)×100 (%) is 15% or less.

1 Claim, 8 Drawing Sheets

(51) Int. Cl.
*G01B 7/28* (2006.01)
*G06F 15/00* (2006.01)
*G01B 11/30* (2006.01)
*G11B 5/84* (2006.01)

(56) References Cited

U.S. PATENT DOCUMENTS

2006/0194080 A1* 8/2006 Ishii et al. .................. 428/64.2
2009/0226667 A1* 9/2009 Ohashi ........................ 428/141
2009/0239101 A1* 9/2009 Shibayama et al. ........ 428/846.9
2011/0109994 A1* 5/2011 Kitsunai et al. ............ 428/846.9
2012/0177949 A1* 7/2012 Nakae .......................... 428/836
2012/0282493 A1* 11/2012 Kitsunai et al. ............ 428/846.9

FOREIGN PATENT DOCUMENTS

JP 2004-185783 A 7/2004
JP 2006-194764 A 7/2006
JP 2009-6423 A 1/2009

* cited by examiner

SUBSTRATE FOR MAGNETIC RECORDING MEDIUM, MAGNETIC RECORDING MEDIUM, METHOD OF MANUFACTURING MAGNETIC RECORDING MEDIUM, AND METHOD OF INSPECTING SURFACE

BACKGROUND OF THE INVENTION

1. Field of the Invention

The present invention relates to a substrate for a magnetic recording medium, a magnetic recording medium, a method of manufacturing a substrate for a magnetic recording medium, and a method of inspecting a surface of a substrate for a magnetic recording medium.

2. Description of Related Art

With the recent increase in demand for hard disk drives (HDD), a magnetic recording medium built in the HDD has been manufactured more and more actively. An aluminum substrate and a glass substrate are widely used as a substrate for a magnetic recording medium. The aluminum substrate has a feature that it is high in workability and is low in cost. On the other hand, the glass substrate has a feature that it is superior in strength. Particularly, requirements for a decrease in size and an increase in density of a magnetic recording medium have recently increased and there is a need for reducing the surface roughness or undulation of the surface when manufacturing the substrate for a magnetic recording medium.

When polishing the surface of such a substrate for a magnetic recording medium, for example, a sun-and-planet gear type polishing machine is used which includes an upper platen and a lower platen pinching a substrate (a polishing object), a lower platen support supporting the lower platen, and a polishing solution supply unit supplying a polishing solution between the upper platen and the lower platen and in which a sun gear protrudes from a hole formed at the center of the lower platen (see Japanese Unexamined Patent Application, First Publication No. 2009-6423). Japanese Unexamined Patent Application, First Publication No. 2009-6423 discloses a configuration in which discharge means for discharging the polishing solution remaining in at least one of the center side of the lower platen and the top surface of the sun gear to the outside is provided to reduce the surface roughness of the polishing object.

Regarding the surface roughness of a magnetic recording medium, it has been proposed that the roughness intensity PSD (Power Spectral Density) of a wavelength of 1 to 5 μm in a spectrum of the surface roughness measured with an atom force microscope (AFM) is set to 0.5 nm² or less and the PSD of a wavelength of 0.5 μm or more and less than 1 μm is set to a range of 0.02 to 0.5 nm² (see Japanese Unexamined Patent Application, First Publication No. 2001-67650). Japanese Unexamined Patent Application, First Publication No. 2001-67650 discloses that the running durability of the magnetic recording medium can be improved by satisfying the above-mentioned numerical range.

Moreover, the power spectrum density (PSD) indicates the surface structure of a substrate which is decomposed into components for each spatial frequency f (a reciprocal of a space period L of undulation) and which is expressed as the density of each component (see Japanese Unexamined Patent Application, First Publication Nos. H09-152324 and 2006-194764).

The relationship between the PSD as the surface structure of a substrate and the root mean square roughness (Rq: old RMS) can be expressed by Expression 1.

Expression 1

$$Rq = \sqrt{\int PSD(f) df} \quad (1)$$

A method of detecting a signal generated through a contact of a detection element disposed in a protrusion inspection head with protrusions by changing a degree of fly of a protrusion inspection head depending on a variation in temperature in a state where the protrusion inspection head is flied from a rotating magnetic recording medium has been proposed as a protrusion inspection method of a magnetic recording medium (see Japanese Unexamined Patent Application, First Publication No. 2004-185783).

In such a magnetic recording medium used in an HDD or the like, there is a need for reducing a distance between the surface of the magnetic recording medium and a magnetic head more than before in response to the requirements of the market for improvements in the recording density.

However, in order to reduce the distance between the surface of the magnetic recording medium and the magnetic head, it is necessary to enhance the surface smoothness of the substrate used for the magnetic recording medium. However, when the surface accuracy of the polishing platen is enhanced, the grain size distribution of polishing grains is sharpened, the number of polishing steps in a polishing process is raised, and the polishing time is increased, the manufacturing cost of the substrate markedly increases.

SUMMARY OF THE INVENTION

The invention is made in consideration of such circumstances and an object thereof is to provide a substrate for a magnetic recording medium and a magnetic recording medium which have superior surface smoothness, a method of manufacturing such a substrate for a magnetic recording medium with superior surface smoothness, and a method for inspecting a surface of a substrate for a magnetic recording medium to obtain such a substrate for a magnetic recording medium with superior surface smoothness.

The invention provides the following inventions.

(1) A substrate for a magnetic recording medium having a disc shape with a central hole, wherein the surface roughness of the principal surface of the substrate is 1 angstrom or less in terms of root mean square roughness (Rq) when a space period (L) of an undulation in the circumferential direction is in the range 10 to 1,000 μm, and when a component in the vertical axis direction of a line segment Z connecting a point A with the space period (L) of 10 μm and a point B with the space period (L) of 1,000 μm in a curve S marked on a double logarithmic graph which is obtained by analyzing the surface roughness using a spectrum and in which the horizontal axis is set to the space period (L) (μm) and the vertical axis is set to the power spectrum density (PSD) (k·angstrom²~μm) (where k is a constant) is defined as H and a displacement at which the component in the vertical axis direction of the curve S is the maximum with respect to the line segment Z is defined as ΔH, a value (P) expressed by ΔH/H×100(%) is 15% or less.

(2) A magnetic recording medium having at least a magnetic layer on the surface of the substrate for a magnetic recording medium according to (1).

(3) A method of manufacturing a substrate for a magnetic recording medium having a disc shape with a central hole including:

a step of performing a grinding process and a polishing process on the principal surface of the substrate for a magnetic recording medium so as to set the surface roughness of the principal surface of the substrate for a magnetic recording medium to be 1 angstrom or less in terms of root mean square roughness (Rq) when a space period (L) of an undulation in the circumferential direction is in the range 10 to 1,000 μm and so as to set a value (P) expressed by ΔH/H×100(%) to be 15% or less, where a component in the vertical axis direction of a line segment Z connecting a point A with the space period (L) of 10 μm and a point B with the space period (L) of 1,000 μm in a curve S marked on a double logarithmic graph which is obtained by analyzing the surface roughness using a spectrum and in which the horizontal axis is set to the space period (L) (μm) and the vertical axis is set to the power spectrum density (PSD) (k·angstrom$^2$·μm) (where k is a constant) is defined as H and a displacement at which the component in the vertical axis direction of the curve S is the maximum with respect to the line segment Z is defined as ΔH.

(4) A method of inspecting a surface of a substrate for a magnetic recording medium having a disc shape with a central hole including:

a step of calculating root mean square roughness (Rq) when a space period (L) of an undulation in the circumferential direction is in the range 10 to 1,000 μm as the surface roughness of the principal surface of the substrate for a magnetic recording medium;

a step of calculating a value (P) expressed by ΔH/H×100 (%), where a component in the vertical axis direction of a line segment Z connecting a point A with the space period (L) of 10 μm and a point B with the space period (L) of 1,000 μm in a curve S marked on a double logarithmic graph which is obtained by analyzing the surface roughness using a spectrum and in which the horizontal axis is set to the space period (L) (Ξm) and the vertical axis is set to the power spectrum density (PSD) (k·angstrom$^2$·μm) (where k is a constant) is defined as H and a displacement at which the component in the vertical axis direction of the curve S is the maximum with respect to the line segment Z is defined as ΔH; and a step of determining a substrate for a magnetic recording medium, of which the value of Rq is 1 angstrom or less and the value of P is 15% or less, as a non-defective product.

(5) A method of manufacturing a substrate for a magnetic recording medium, including an inspection step using the method for inspecting a surface according to (4).

As described above, according to the aspects of the present invention, it is possible to provide a magnetic recording medium and a substrate for a magnetic recording medium with superior surface smoothness, a method of manufacturing such a substrate for a magnetic recording medium with superior surface smoothness, and a method of inspecting a surface for obtaining such a substrate for a magnetic recording medium with superior surface smoothness.

In addition, according to the present invention, since the distance between the surface of the magnetic recording medium and the magnetic head can be reduced, it is possible to further improve the recording density of the magnetic recording medium.

Furthermore, according to the present invention, since defectiveness and non-defectiveness of a substrate for a magnetic recording medium capable of coping with an increase in recording density can be determined, it is possible to further reduce the manufacturing cost thereof.

DETAILED DESCRIPTION OF THE INVENTION

Figure 1:
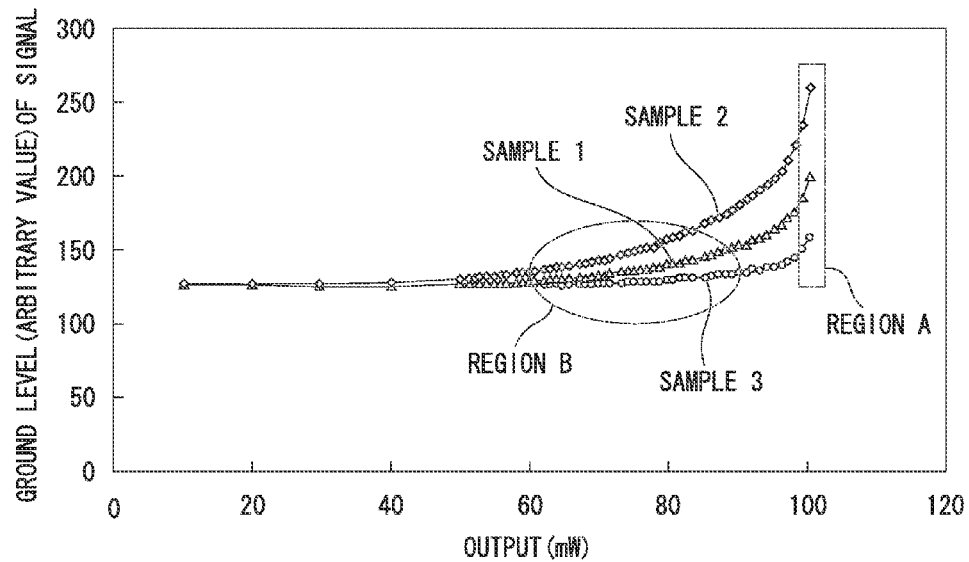
FIG. 1 is a graph illustrating the relationship between power input to a head slider and the ground level of a signal output from a magnetic head regarding magnetic recording media of samples 1 to 3.

Hereinafter, a substrate for a magnetic recording medium, a magnetic recording medium, and a method of manufacturing the substrate for a magnetic recording medium according to the present invention will be described in detail with reference to the accompanying drawings.

In the drawings used in the following description, feature parts may be enlarged in order to easily understand features and the scales of the elements and the like are not limited to the actual ones. Materials, sizes, and the like provided in the following description are only examples, and the present invention is not limited to the examples, but may be appropriately modified without departing from the concept of the present invention.

In order to achieve the above-mentioned object, the inventors of the present invention first studied the relationship between the surface roughness of a magnetic recording medium, the flying height of a magnetic head, and the signal intensity output from the magnetic head. Specifically, as shown in Table 1, magnetic recording mediums (Samples 1 to 3) having substantially equivalent root mean square roughness (surface roughness) Rq were manufactured and a reading and writing test using a magnetic head was carried out on the magnetic recording mediums of Samples 1 to 3. The evaluation results thereof are shown in FIG. 1.

TABLE 1

|  | Sample 1 | Sample 2 | Sample 3 |
|---|---|---|---|
| Undulation range of Rq (μm) | 10 to 1,000 | 10 to 1,000 | 10 to 1,000 |
| Surface Roughness Rq (angstrom) | 0.48 | 0.50 | 0.47 |

In the reading and writing test, a magnetic head in which a thermal flying height varying device causing the flying height of the magnetic head to vary depending on a variation in temperature is formed in a slider of a head was used as the same magnetic head as described in Japanese Unexamined Patent Application, First Publication No. 2004-185783, that is, the magnetic head having a slider and used to inspect the magnetic recording mediums in a state where it is flied from the rotating magnetic recording mediums.

In the graph shown in FIG. 1, the horizontal axis represents power input to the head slider and the vertical axis represents the ground level of a signal output from the magnetic head. In this graph, 10 mW of the power input to the head slider corresponds to displacement of about 1 nm.

It can be seen from the graph shown in FIG. 1 that the head slider thermally expands and the distance between the surface of the magnetic recording medium and the magnetic head decreases as the power input to the head slider increases, and that a stronger noise signal is output due to frictional heat generated at the time of contact thereof as the magnetic head gets closer to the surface of the magnetic recording medium (see region A in FIG. 1).

The inventors of the present invention studied the relationship between the surface roughness Rq and the ground level of the signal when the power input to the head slider is made to vary with respect to the magnetic recording mediums of Samples 1 to 3.

As a result, as shown in FIG. 1, it could be seen that the input power of region A in the magnetic recording mediums of Samples 1 to 3 having substantially the same surface roughness Rq is almost equal but a clear difference is generated in the signal level of region B. Region B in FIG. 1 corresponds to conditions in which the magnetic recording mediums are actually used in an HDD and the vicinity thereof.

The inventors of the present invention studied the reasons thereof and found that the reason is resonance of the head slider or a suspension arm supporting the head slider.

That is, in region B in FIG. 1, since the surface of the magnetic recording medium does not come in contact with the magnetic head, the ground levels of the signals output from the magnetic head with respect to the magnetic recording mediums having the same surface roughness Rq would be equal to each other. On the other hand, when the magnetic head slightly vibrates due to the resonance or the like, the distance between the surface of the magnetic recording medium and the magnetic head slightly varies. As a result, the ground level of the signal output from the magnetic head varies, and this variation becomes more marked as the distance between the surface of the magnetic recording medium and the magnetic head decreases.

The inventors of the present invention studied the surface roughness and the undulation of a substrate for a magnetic recording medium which can prevent the resonance of the head slider or the suspension arm supporting the head slider on the basis of the above-mentioned finding.

Figure 2:
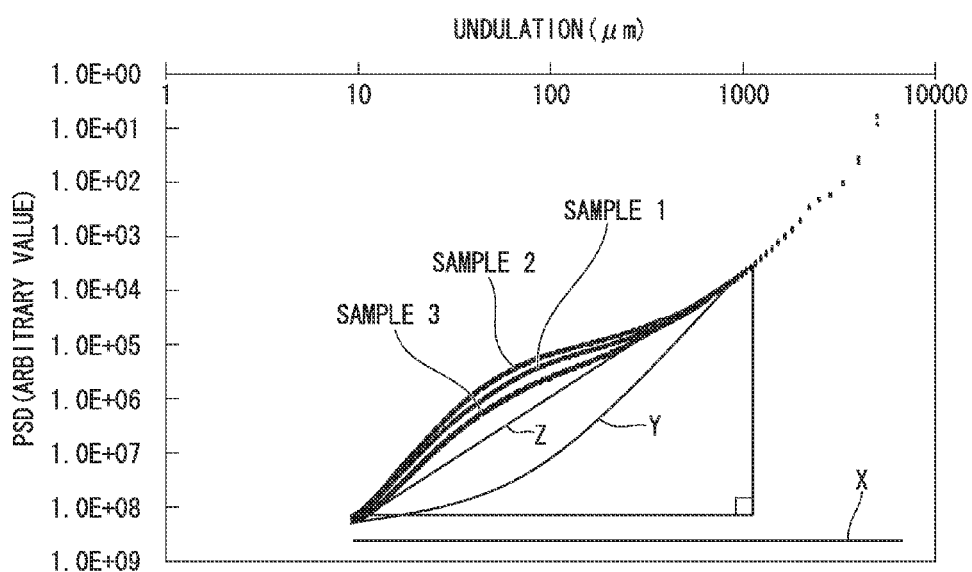
FIG. 2 is a graph illustrating the relationship between an undulation and a PSD regarding the magnetic recording media of samples 1 to 3.

FIG. 2 is a double logarithmic graph illustrating the relationship between a space period L [μm] of the undulation and the PSD [k·angstrom$^2$·μm], which is obtained by spectrum analyzing the surface roughness of the magnetic recording mediums of Samples 1 to 3 shown in Table 1. Here, k is a constant, is determined depending on an apparatus factor when measuring the PSD, and is ideally 1.

The graph shown in FIG. 2 can be obtained by causing a laser beam to be incident on the surface of the magnetic recording medium and analyzing the reflected beam using a spectrum. That is, even the surface of a substrate smoothly polished has slight undulation (a structure with a space period of 1 μm to 1 mm) or roughness (a structure with a space period of less than 1 μm). When a laser beam is incident on the surface, the reflected beam thereof is scattered by the slight undulation of the surface or the like. A plurality of scattered beams overlap and generate a buffer due to the phase difference of the scattered beams.

Figure 3:
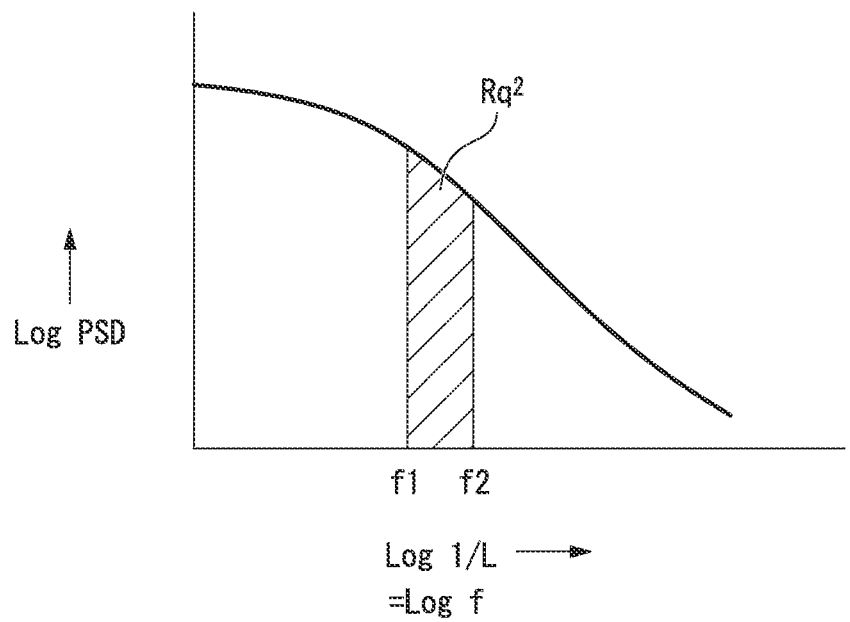
FIG. 3 is a graph illustrating the relationship between the surface roughness Rq and the PSD.

The relationship between the surface roughness Rq and the PSD reflecting the surface structure of the substrate can be expressed by Expression 2 and FIG. 3.

Expression 2

$$Rq^2 = \int_{f1}^{f2} PSD(f)\,df \qquad (2)$$

Here, f represents the spatial frequency and corresponds to the reciprocal (1/L) of the space period L of the undulation or the like.

The PSD is obtained by decomposing the surface structure of the substrate into spatial frequency components and calculating the density of each component. By replacing the spatial frequency f in Expression 2 with the space period L, the graph shown in FIG. 2 can be obtained.

When the relationship between the undulation and the PSD shown in FIG. 2 is measured using the above-mentioned scattering of a laser beam and no scattered beam is generated (for example, when there is no substrate), the straight line X shown in FIG. 2 can be obtained.

On the other hand, when a certain scattered beam is generated, the curve Y shown in FIG. 2 can be obtained through the noise floor of a detector. That is, a scattered spectrum on an ideal smooth surface gets infinitely closer to the curve Y.

On the contrary, in the present invention, without infinitely reducing the surface roughness or the undulation of the substrate and approaching an ideal smooth surface, the line segment Z shown in FIG. 2 is approached while allowing a certain degree of surface roughness or undulation.

That is, in the present invention, the surface roughness or undulation of a substrate is uniformized in a wide wavelength range. Accordingly, vibrations at various frequencies generated in a magnetic head flying and running over the surface of the magnetic recording medium rotating at a high speed are cancelled each other. As a result, it was found that the variation in the ground level of a signal in region A shown in FIG. 1 could be reduced.

The invention is made on the basis of the above-mentioned findings. That is, the present invention provides a substrate for a magnetic recording medium having a central hole, wherein the surface roughness of the principal surface of the substrate is 1 angstrom or less in terms of root mean square roughness (Rq) when a space period (L) of an undulation in the circumferential direction is in the range 10 to 1,000 µm, and wherein when a component in the vertical axis direction of a line segment Z connecting a point A with the space period (L) of 10 µm and a point B with the space period (L) of 1,000 µm in a curve S marked on a double logarithmic graph which is obtained by analyzing the surface roughness using a spectrum and in which the horizontal axis is set to the space period (L) (µm) and the vertical axis is set to the power spectrum density (PSD) (k·angstrom$^2$·µm) (where k is a constant) is defined as H and a displacement at which the component in the vertical axis direction of the curve S is the maximum is defined as ΔH, a value (P) expressed by (ΔH/H)×100(%) is 15% or less.

Specifically, in the present invention, the surface roughness Rq of the principal surface of the substrate for a magnetic recording medium is set to be 1 angstrom or less and preferably to be 0.7 angstrom or less. When the surface roughness Rq exceeds 1 angstrom, the ascending of the ground level of a signal shown in region A shown in FIG. 1 is shifted to the left and it is thus difficult to secure a physical spacing between the surface of the magnetic recording medium and the magnetic head. The magnetic head can come easily in contact with the surface of the magnetic recording medium and it is thus difficult to cope with an increase in recording density of the magnetic recording medium.

Figure 4:
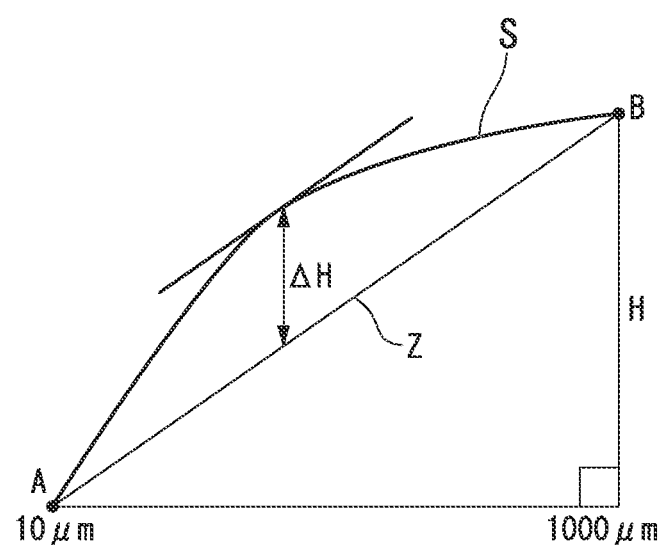
FIG. 4 is a graph used to calculate ΔH in which the component in the vertical axis of a curve S with respect to a line segment Z is the maximum.

In the present invention, as shown in FIG. 4, in the graph illustrating the relationship between the undulation and the PSD, a line segment Z connecting a point A at which the space period L of the undulation of the curve S is 10 µm and a point B at which the space period is 1,000 µm is drawn, and the displacement ΔH, at which the component of the curve S in the vertical axis direction with respect to the line segment Z is the maximum, is calculated.

Regarding ΔH, the curve S may be convex upward from the line segment Z, or may be convex downward, or may be convex upward and downward, but the value at which the absolute value of the displacement of the curve S with respect to the line segment Z is the maximum has only to be calculated.

In the present invention, the ratio of ΔH to the component H of the line segment Z in the vertical axis direction, that is, the value P of (ΔH/H)×100 [%], is preferably set to be 15% or less, more preferably to be 10% or less, and still more preferably to be 0%, that is, is matched with the line segment Z.

Accordingly, it is possible to reduce the vibration of the magnetic head flying and running over the surface of the magnetic recording medium rotating at a high speed of 7000 rpm or higher. It is also possible to reduce the increasing rate of the ground level in region B in FIG. 1. Accordingly, it is possible to raise the SN ratio of the magnetic recording medium and to reduce the physical spacing between the surface of the magnetic recording medium and the magnetic head.

The present invention also provides a magnetic recording medium having at least a magnetic layer on the substrate for a magnetic recording medium satisfying the above-mentioned numerical ranges of the present invention. The magnetic recording medium has a multi-layered film such as a magnetic layer on the surface of the substrate for a magnetic recording medium satisfying the above-mentioned numerical range of the present invention. Such a multi-layered film is formed mainly using a sputtering method, but since the thickness of the film is uniform, the surface of the magnetic recording medium reflects the surface shape of the substrate for a magnetic recording medium.

Accordingly, in the magnetic recording medium according to the present invention, since the distance between the surface of the magnetic recording medium and the magnetic head can be reduced and thus the variation of the ground level of a signal in region A shown in FIG. 1 can be reduced, it is possible to cope with an increase in recording medium.

Method of Manufacturing Substrate for Magnetic Recording Medium

The method of manufacturing a substrate for a magnetic recording medium according to the present invention will be described in detail below.

The substrate for a magnetic recording medium according to the present invention is a substrate having a disc shape with a central hole, and the magnetic recording medium is formed as a magnetic disk in which a magnetic layer, a protective layer, a lubricant film, and the like are sequentially stacked on the surface of the substrate. In the HDD (magnetic recording and reproducing apparatus), the central portion of the magnetic recording medium is mounted on a rotating shaft of a spindle motor and information is recorded on or read from the magnetic recording medium while causing the magnetic head to fly and run over the surface of the magnetic recording medium which is rotationally driven by the spindle motor.

Examples of the substrate for a magnetic recording medium include non-magnetic substrates such as an aluminum substrate and a glass substrate, but an example where a glass substrate is used is described in this embodiment.

When manufacturing the substrate for a magnetic recording medium, a glass substrate having a disc shape with a central hole is obtained by cutting a glass substrate out of a large plate-like glass substrate or directly press-shaping a glass substrate from molten glass by the use of a shaping mold.

A grinding (lapping) process and a polishing process are performed on the surface (the principal surface) other than an end face of the resultant glass substrate. In the present invention, a chamfering process on inner and outer circumferential end faces of the glass substrate may be performed as the same process as the grinding process. The grinding process on the inner and outer circumferential end faces of the glass substrate is not limited to a single step, but may be performed in two steps (first and second grinding processes).

In an example of this embodiment, a first principal surface grinding step, an inner and outer circumferential end face grinding step, an inner circumferential end face polishing step, a second principal surface grinding step, an outer circumferential end face polishing step, a first principal surface polishing step, and a second principal surface polishing step are sequentially performed in this order.

First Principal Surface Grinding Step

Figure 5:
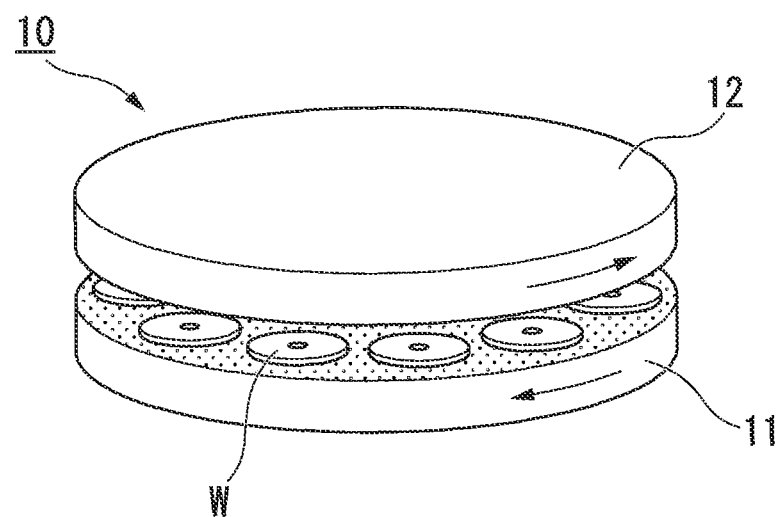
FIG. 5 is a diagram illustrating a process of manufacturing a substrate for a magnetic recording medium according to the present invention and is a perspective view illustrating a first principal surface grinding step.

In the first principal surface grinding step, a grinding process is performed on both principal surfaces (surfaces which finally become recording surfaces of a magnetic recording medium) of a glass substrate W using a lapping machine 10 shown in FIG. 5.

That is, the lapping machine 10 includes a pair of upper and lower platens 11 and 12 and grinds both principal surfaces of plural glass substrates W through the use of a grinding pad disposed in the platens 11 and 12 in a state where the plurality of glass substrates W between the platens 11 and 12 rotating in the opposite directions.

A grinding whetstone can be used as the grinding pad. A grinding material contained in the grinding whetstone is not particularly limited, but for example, alumina, ceria (cerium oxide), silica, diamond, or mixtures thereof can be used.

Inner and Outer Circumference Grinding Step

Figure 6:
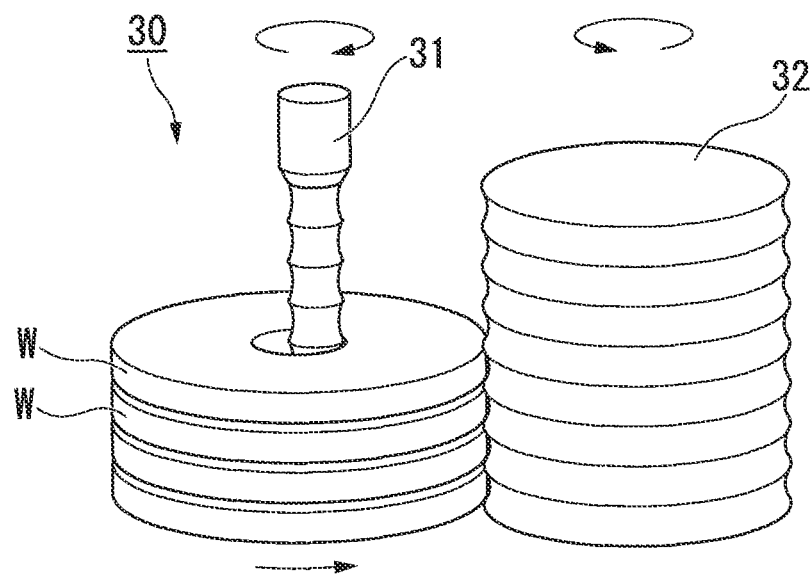
FIG. 6 is a diagram illustrating the process of manufacturing a substrate for a magnetic recording medium according to the present invention and is a perspective view illustrating an inner and outer circumferential end face grinding step.

In the inner and outer circumferential end face grinding step, a grinding process is performed on an inner circumferential end faces of the central holes of the glass substrates W and the outer circumferential end faces of the glass substrates W by the use of a grinding machine 30 shown in FIG. 6. That is, the grinding machine 30 includes an inner circumferential whetstone 31 and an outer circumferential whetstone 32, and interposes the glass substrates W in the diameter direction between the inner circumferential whetstone 31 inserted into the central holes of the glass substrates W and the outer circumferential whetstone 32 disposed on the outer circumferences of the glass substrates W while rotating a stacked body, in which the plural glass substrates W are stacked with spacers interposed therebetween in a state where the central holes are matched with each other, about an axis, and rotates the inner circumferential whetstones 31 and the outer circumferential whetstones 32 in the opposite direction to the rotation of the stacked body. Accordingly, the inner circumferential end faces of the glass substrates W are ground with the inner circumferential whetstone 31 and the outer circumferential faces of the glass substrates W are ground with the outer circumferential whetstone 32, while guaranteeing the concentricity of the inner diameters and the outer diameters of the glass substrates W.

Since the surfaces of the inner circumferential whetstone 31 and the outer circumferential whetstone 32 have a wave-like shape in which protrusions and grooves are alternately arranged in the axis direction, it is possible to grind the inner circumferential end faces and the outer circumferential end faces of the glass substrates W and to perform a chamfering process on the edges (the chamfered faces) between both principal surfaces of the glass substrates W and the inner and outer circumferential end faces thereof.

For example, whetstones in which diamond polishing particles are fixed through the use of a binder can be used as the inner circumferential whetstone 31 and the outer circumferential whetstone 32. Examples of the binder include metal such as copper, copper alloy, nickel, nickel alloy, cobalt, and tungsten carbide.

Inner Circumference Polishing Step

Figure 7:
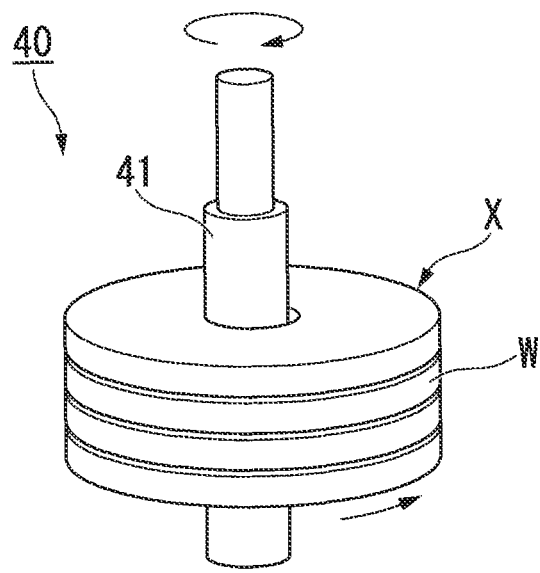
FIG. 7 is a diagram illustrating the process of manufacturing a substrate for a magnetic recording medium according to the present invention and is a perspective view illustrating an inner circumferential end face polishing step.

In the inner circumferential end face polishing step, a polishing process is performed on the inner circumferential end faces of the central holes of the glass substrates W by the use of a polishing machine 40 shown in FIG. 7. That is, the polishing machine 40 includes an inner circumference polishing brush 41, causes the stacked body to rotate about an axis and causes the inner circumference polishing brush 41 inserted into the central holes of the glass substrates W to rotate in the reverse direction of the rotation of the glass substrates W while moving in the vertical direction. At this time, a polishing solution is dropped to the inner circumference polishing brush 41. The inner circumferential end faces of the glass substrates W are polished with the inner circumference polishing brush 41. At the same time, the edges (the chamfered faces) of the inner circumferential end faces, which have been subjected to the chamfering process in the inner and outer circumferential end face grinding step, are also polished. For example, a slurry in which silicon oxide (colloidal silica) polishing particles or cerium oxide polishing particles are dispersed in water can be used as the polishing solution.

Second Principal Surface Grinding Step

In the second principal surface grinding step, similarly to the first principal surface grinding step, a grinding process is performed on both principal surfaces of a glass substrate W using a lapping machine 10 and the grinding pad shown in FIG. 5. That is, plural glass substrates W are inserted between a pair of upper and lower platens 11 and 12 rotating in the opposite directions and both principal surfaces of the glass substrate W are smoothly ground by the use of the polishing pad disposed in the platens 11 and 12.

Moreover, the invention is not limited to two principal surface grinding steps including the first and second principal surface grinding steps, but may employ a single principal surface grinding step into which the two steps are combined to improve productivity.

Outer Circumference Polishing Step

Figure 8:
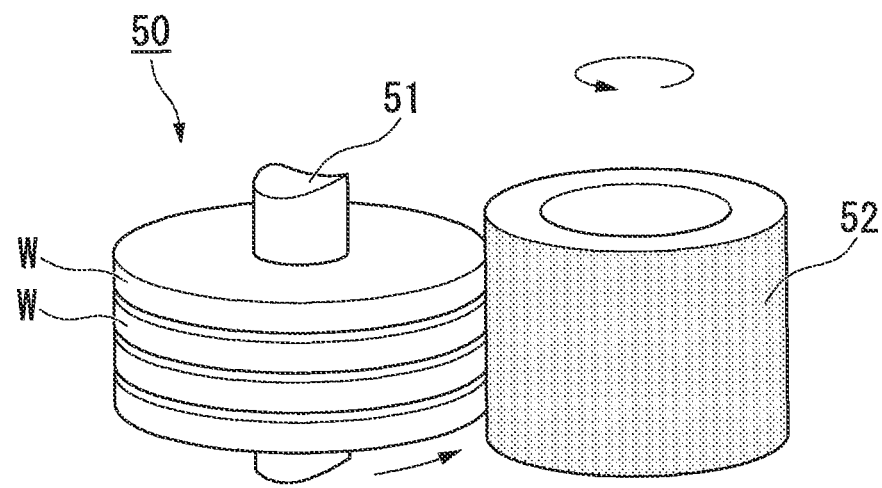
FIG. 8 is a diagram illustrating the process of manufacturing a substrate for a magnetic recording medium according to the present invention and is a perspective view illustrating an outer circumferential end face polishing step.

In the outer circumferential end face polishing step, a polishing process is performed on the outer circumferential end faces of the glass substrates W by the use of the polishing machine 50 shown in FIG. 8. That is, the polishing machine 50 includes a rotating shaft 51 and an outer circumference polishing brush 52, causes a stacked body, in which plural glass substrates W are stacked with spacers interposed therebetween in a state where the central holes thereof are matched with each other, to rotate about an axis by the use of the rotating shaft 51 inserted into the central holes of the glass substrates W, and causes the outer circumference polishing brush 52 to move in the vertical direction while causing the outer circumference polishing brush 52 in contact with the outer circumferential end faces of the glass substrates W to rotate in the opposite direction of the rotation of the stacked body. At this time, a polishing solution is dropped to the outer circumference polishing brush 52. The outer circumferential end faces of the glass substrates W are polished with the outer circumference polishing brush 52. At the same time, the edges (the chamfered faces) of the outer circumferential end faces, which have been subjected to the chamfering process in the inner and outer circumference grinding step, are also polished.

For example, slurry in which cerium oxide polishing particles are dispersed in water or the like can be used as the polishing solution.

First Principal Surface Polishing Step

Figure 9:
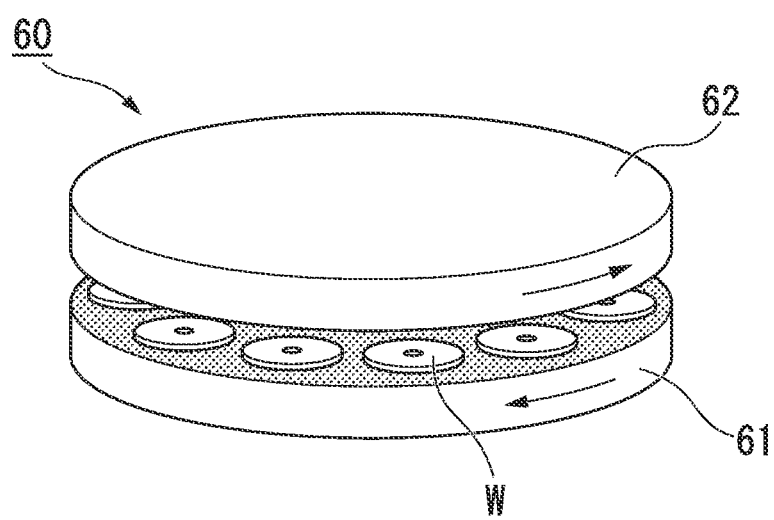
FIG. 9 is a diagram illustrating the process of manufacturing a substrate for a magnetic recording medium according to the present invention and is a perspective view illustrating a principal surface polishing step.

In the first principal surface polishing step, a polishing process is performed on both principal surfaces of a glass substrate W by the use of a polishing machine 60 shown in FIG. 9. That is, the polishing machine 60 includes a pair of upper and lower platens 61 and 62, and interposes plural glass substrates W between the platens 61 and 62 rotating in the opposite directions, and polishes both principal surfaces of the glass substrates W by the use of polishing pads disposed in the platens 61 and 62 to further raise the smoothness of the substrates.

A hard polishing cloth formed of, for example, urethane can be used as the polishing pad. When polishing both principal surfaces of the glass substrates W by the use of the polishing pads, a polishing solution is dropped to the glass substrates W. For example, a slurry in which polishing particles of ceria, silica, diamond, or mixtures thereof are dispersed in water can be used as the polishing solution.

Second Principal Surface Polishing Step

In the second principal surface polishing step, similarly to the first principal surface polishing step, a polishing process is performed on both principal surfaces of a glass substrate W by the use of the polishing machine 60 shown in FIG. 9. That is, the surfaces are finally finished by inserting plural glass substrates W between the platens 61 and 62 rotating in the opposite directions and polishing both principal surfaces of the glass substrates W with the polishing pads disposed in the platens 61 and 62.

For example, a suede-like soft polishing cloth can be used as the polishing pad. When polishing both principal surfaces of the glass substrates W using the polishing pad, for example, a polishing solution as slurry obtained by dispersing cerium oxide, colloidal silica, diamond, or mixtures thereof in a dispersion medium such as water is used.

Moreover, the invention is not limited to two principal surface polishing steps including the first and second principal surface polishing steps, but may employ a single principal surface polishing step into which the two steps are combined from the viewpoint of productivity.

Figure 10:
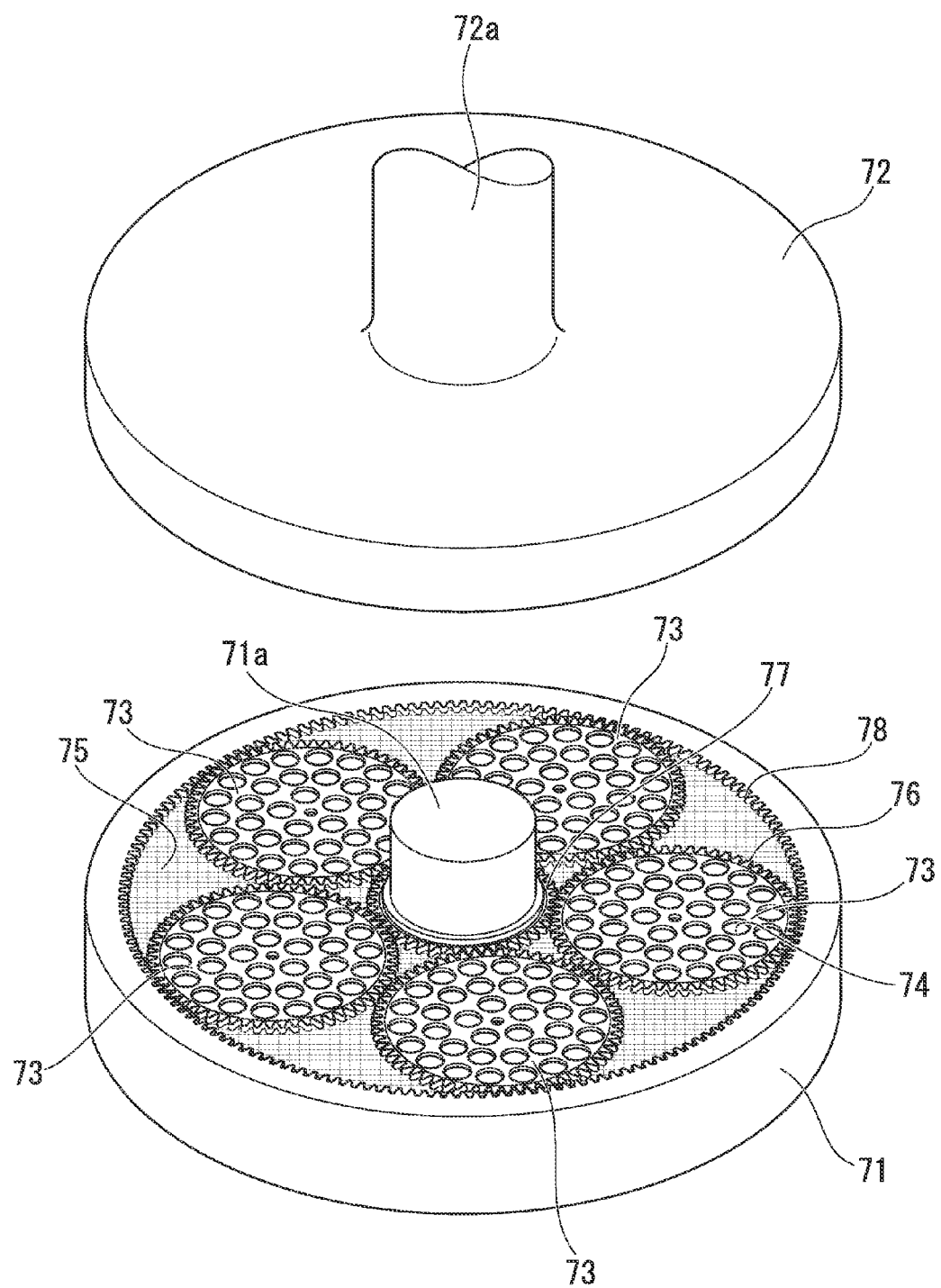
FIG. 10 is a perspective view illustrating another configurational example of a lapping machine or a polishing machine used in the present invention.

The lapping machine 10 shown in FIG. 5 and the polishing machine 60 shown in FIG. 9 may be configured so that each thereof includes a pair of lower platen 71 and upper platen 72 and plural carriers 73 arranged on the surfaces opposed to the lower platen 71 and the upper platen 72, for example, as shown in FIG. 10, glass substrates (not shown) are set into plural (35 in this embodiment) openings 74 disposed in the carriers 73, and both principal surfaces of the plural glass substrates are ground or polished with grinding pads or polishing pads disposed in the lower platen 71 and the upper platen 72.

Specifically, the lower platen 71 and the upper platen 72 can rotate in the opposite directions by rotationally driving rotating shafts 71a and 72a disposed at the centers thereof by the use of a driving motor (not shown). A concave portion 75 in which the plural (five in this embodiment) carriers 73 are arranged is formed on the surface of the lower platen 71 opposed to the upper platen 72.

The plural carriers 73 are formed of a member obtained by forming an epoxy resin or the like, which is reinforced, for example, by mixing aramid fiber or glass fiber thereto, in a disc shape. The plural carriers 73 are arranged around the rotating shaft 71a in the concave portion 75. A planet gear portion 76 is formed on the outer circumference of each carrier 73 over the total circumference. On the other hand, a sun gear portion 77 rotating along with the rotating shaft 71a is disposed in the inner circumference of the concave portion 75 in a state where it engages with the planet gear portions 76 of the carriers 73, and a fixed gear portion 78 engaging with the planet gear portions 76 of the carriers 73 is disposed on the outer circumference of the concave portion 75.

Accordingly, when the sun gear portion 77 rotates along with the rotating shaft 71a, the plural carriers 73 carry out a so-called sun-and-planet motion in which the carriers rotate (revolve) around the rotating shaft 71a in the concave portion 75 in the same direction as the rotating shaft 71a and the carriers rotate (axially rotate) around the central axes thereof in the opposite direction of the rotation of the rotating shaft 71a, due to the engagement of the sun gear portion 77 and the fixed gear portion 78 with the planet gear portions 76.

Therefore, by employing the above-mentioned configuration, both principal surfaces of the plural glass substrates W can be ground or polished with the grinding pads or the polishing pads disposed in the lower platen 71 and the upper platen 72 while causing the glass substrates W held in the openings 74 of the carriers 73 to carry out a sun-and-planet motion.

By employing this configuration, it is possible to accurately and rapidly grind or polish the glass substrates W.

Final Cleaning and Inspection Step

The glass substrates W having been subjected to the above-mentioned grinding and polishing processes are provided to a final cleaning step and an inspection step. In the final cleaning step, the glass substrates W are cleaned through the use of methods such as chemical cleaning using detergent (chemical) along with ultrasonic waves to remove the polishing agent or the like used in the above-mentioned steps.

On the other hand, in the inspection step, the presence or absence of scratches or strains on the surface (the principal surfaces, the end faces, and the chamfered faces) of a glass substrate W is determined through the use of an optical tester using a laser beam.

In the present invention, in the inspection step, a substrate for a magnetic recording medium which satisfies the numerical range of the present invention, that is, in which the value of $R_q$ is 1 angstrom or less and the value of P is 15% or less, is determined as a non-defective product. On the other hand, when the inspection result departs from the numerical range of the present invention, the result is fed back to the manufacturing steps at once and an adjustment is carried out to satisfy the numerical range of the present invention.

In the inspection step, a sampling inspection for every fixed sheets may be performed in addition to the total inspection of the manufactured glass substrates. In this case, it is preferable that the numerical range of the present invention be narrowed to consider a safety factor.

In the present invention, the manufacturing steps to which the inspection result is fed back include the first and second principal surface grinding steps and the first and second principal surface polishing steps of grinding and polishing the principal surfaces of the glass substrates W. Particularly, in the present invention, since very minute surface shapes are important, the influence of the second principal surface grinding step and the second principal surface polishing step is great and the influence of the second principal surface polishing step is the greatest. Various factors such as the surface accuracy of the platens, the surface accuracy of the polishing pads, the abrasion state, the quality of the polishing material, the supply of the polishing material, the weight to be added to the polishing platen, the rotation speed of the polishing platen, the polishing time, and the polishing temperature are managed in the steps.

Magnetic Recording Medium

A magnetic recording medium shown in FIG. 11 will be described below as an embodiment of the present invention.

Figure 11:
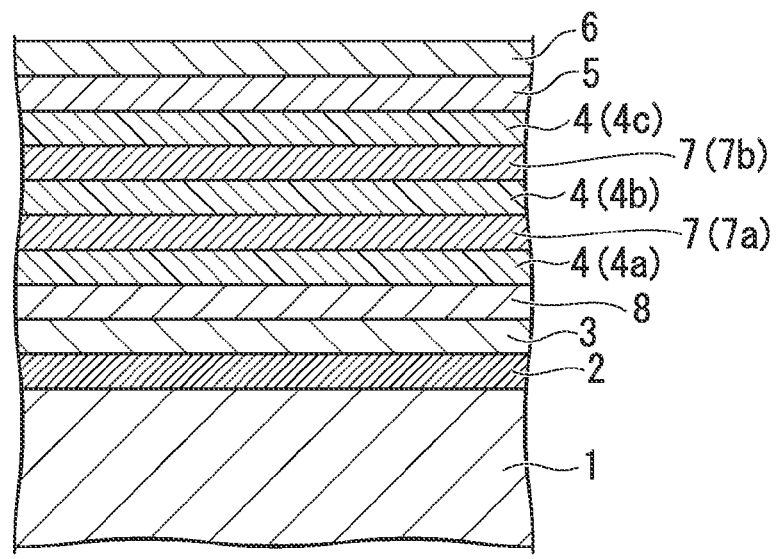
FIG. 11 is a cross-sectional view illustrating an example of a magnetic recording medium to which the present invention is applied.

FIG. 11 is a cross-sectional view illustrating an example of the magnetic recording medium according to the present invention.

As shown in FIG. 11, the magnetic recording medium has a structure in which a soft magnetic underlayer 2, a first orientation control layer 3, a second orientation control layer 8, a vertical magnetic layer 4, and a protective layer 5 are sequentially stacked on a substrate (non-magnetic substrate) 1 for a magnetic recording medium satisfying the numerical range of the present invention and a lubricant film 6 is formed thereon.

The vertical magnetic layer 4 includes three layers of a lower magnetic layer 4a, an intermediate magnetic layer 4b, and an upper magnetic layer 4c sequentially from the non-magnetic substrate 1 and also includes a non-magnetic layer 7a between the magnetic layer 4a and the magnetic layer 4b and a non-magnetic layer 7b between the magnetic layer 4b and the magnetic layer 4a, that is, has a structure in which the magnetic layers 4a to 4c and the non-magnetic layers 7a and 7b are alternately stacked.

Although not shown in the drawing, crystal grains constituting the magnetic layers 4a to 4c and the non-magnetic layers 7a and 7b form a columnar crystal continuous in the thickness direction along with crystal grains constituting the first orientation control layer 3.

The non-magnetic substrate 1 is in contact with the soft magnetic underlayer 2 containing Co or Fe as a major component and thus may be corroded due to the adsorbed gas on the surface thereof, the influence of moisture, the diffusion of substrate components, and the like. In this case, it is preferable that an adhesion layer be disposed between the non-magnetic substrate 1 and the soft magnetic underlayer 2 to suppress the factors. For example, Cr, Cr alloy, Ti, and Ti alloy can be appropriately selected as the material of the adhesion layer. The thickness of the adhesion layer is preferably 2 nm (20 angstrom) or more.

The soft magnetic underlayer 2 is provided to increase the component of a magnetic flux generated from the magnetic head in the direction perpendicular to the surface of the substrate and to fix the direction of magnetization of the vertical magnetic layer 4 having information recorded thereon more strongly to the direction perpendicular to the non-magnetic substrate 1. This action becomes marked when a vertical-recording single-pole head is used as the magnetic head for recording and reproduction.

A soft magnetic material including, for example, Fe, Ni, or Co can be used for the soft magnetic underlayer 2. Specific examples of the soft magnetic material include CoFe-based alloys (such as CoFeTaZr and CoFeZrNb), FeCo-based alloys (such as FeCo and FeCoV), FeNi-based alloys (such as FeNi, FeNiMo, FeNiCr, and FeNiSi), FeAl-based alloys (such as FeAl, FeAlSi, FeAlSiCr, FeAlSiTiRu, and FeAlO), FeCr-based alloys (such as FeCr, FeCrTi, and FeCrCu), FeTa-based alloys (such as FeTa, FeTaC, and FeTaN), FeMg-based alloys (such as FeMgO), FeZr-based alloys (such as FeZrN), FeC-based alloys, FeN-based alloys, FeSi-based alloys, FeP-based alloys, FeNb-based alloys, FeHf-based alloys, and FeB-based alloys.

It is preferable that the soft magnetic underlayer 2 include two layers of a soft magnetic film and include an Ru film between the two layers of a soft magnetic film. By adjusting the thickness of the Ru film to be in a range of 0.4 to 1.0 nm or a range of 1.6 to 2.6 nm, the two layers of a soft magnetic film forms an AFC structure. By employing this AFC structure, it is possible to suppress so-called spike noise.

The second orientation control layer 8 is preferably disposed between the first orientation control layer 3 and the vertical magnetic layer 4. In this case, the growth of crystal is easily disturbed in the initial part of the vertical magnetic layer 4 located just above the first orientation control layer 3, which serves as a reason of the noise. By replacing the disturbed part of the initial part with the second orientation control layer 8, it is possible to suppress the generation of noise.

The material of the second orientation control layer 8 is not particularly limited, but preferably employs a material having an hcp structure, a fcc structure, or an amorphous structure. Particularly, Ru alloy, Ni alloy, Co alloy, Pt alloy, or Cu alloy can be preferably used and Ru or alloy including Ru as a major component can be more preferably used. The thickness of the second orientation control layer 8 is preferably in a range of 5 nm to 30 nm.

Among the layers constituting the vertical magnetic layer 4, the lower and intermediate magnetic layers 4a and 4b are formed of a material including Co as a major component and including an oxide 41. For example, oxides of Cr, Si, Ta, Al, Ti, Mg, and Co can be preferably used as the oxide 41. Among these, $TiO_2$, $Cr_2O_3$, $SiO_2$, and the like can be suitably used. The upper magnetic layer 4a is preferably formed of complex oxide including two or more types of oxide. Among these, $Cr_2O_3$—$SiO_2$, $Cr_2O_3$—$TiO_2$, $Cr_2O_3$—$SiO_2$—$TiO_2$, and the like can be suitably used.

Examples of the material suitable for the magnetic layers 4a and 4b include alloy-based materials such as (CoCrPt)—($Ta_2O_5$), (CoCrPt)—($Cr_2O_3$)—($TiO_2$), (CoCrPt)—($Cr_2O_3$)—($SiO_2$), (CoCrPt)—($Cr_2O_3$)—($SiO_2$)—($TiO_2$), (CoCrPtMo)—(TiO), (CoCrPtW)—($TiO_2$), (CoCrPtB)—($Al_2O_3$), (CoCrPtTaNd)—(MgO), (CoCrPtBCu)—($Y_2O_3$), and (CoCrPtRu)—($SiO_2$), in addition to 90(Co14Cr18Pt)-10($SiO_2$) (in which the mole concentration calculated with a magnetic particle having a Cr content of 14 at %, a Pt content of 18 at %, and the balance of Co as a single compound is 90 mol % and the oxide composition of $SiO_2$ is 10 mol %: which is true in the following), 92(Co10Cr16Pt)-8($SiO_2$), and 94(Co8Cr14Pt4Nb)-6($Cr_2O_3$).

The upper magnetic layer 4c is preferably formed of a material including Co as a major component and not including oxide and preferably has a structure in which magnetic particles 42 in the layers grow in a columnar shape from the magnetic particles 42 of the magnetic layer 4a in an epitaxial manner. In this case, it is preferable that the magnetic particles 42 of the magnetic layers 4a to 4c correspond to each other in a one-to-one manner in the layers and grow in a columnar shape in an epitaxial manner. Since the magnetic particles 42 of the intermediate magnetic layer 4b epitaxially grow form the magnetic particles 42 of the lower magnetic layer 4a, the magnetic particles 42 of the intermediate magnetic layer 4b further decrease in size and thus the crystallization and the orientation are further improved.

Examples of the material of the magnetic layer 4c include CoCrPt-based materials and CoCrPtB-based materials. In the case of the CoCrPtB-based materials, the total content of Cr and B is preferably in a range of 18 at % to 28 at %.

The thickness of the vertical magnetic layer 4 is preferably in a range of 5 to 20 nm. When the thickness of the vertical magnetic layer 4 is less than the range, a satisfactory reproduction output is not obtained and thermal fluctuation characteristic is lowered. When the thickness of the vertical magnetic layer 4 exceeds the range, the magnetic particles in the vertical magnetic layer 4 increase in size, the noise at the time of recording and reproduction increases, and recording and reproduction characteristics such as a signal/noise ratio (S/N ratio) or a recording characteristic (OW) deteriorates, which is not desirable.

The non-magnetic layers 7a and 7b interposed between the magnetic layers 4a to 4c constituting the vertical magnetic layer 4 are preferably formed of materials having a structure in which metal particles of the above-mentioned alloys are dispersed in oxide, metal nitride, or metal carbide. The metal particles preferably have a columnar structure vertically penetrating the non-magnetic layers 7a and 7b. In order to achieve this structure, it is preferable that alloy materials including oxide, metal nitride, or metal carbide be used. Specifically, examples of the oxide include $SiO_2$, $Al_2O_3$, $Ta_2O_5$, $Cr_2O_3$, MgO, $Y_2O_3$, and $TiO_2$. Examples of the metal nitride include AlN, $Si_3N_4$, TaN, and CrN. Examples of the metal carbide include TaC, BC, and SiC. For example, CoCr—$SiO_2$, CoCr—$TiO_2$, CoCr—$Cr_2O_3$, CoCrPt—$Ta_2O_5$, Ru—$SiO_2$, Ru—$Si_3N_4$, and Pd—TaC can be used.

The protective layer 5 serves to prevent the corrosion of the vertical magnetic layer 4 and to prevent damage of the surface of the magnetic recording medium when the magnetic head comes in contact with the magnetic recording medium, and can be formed of a known material. Examples of the material include materials including C, $SiO_2$, or $ZrO_2$. The thickness of the protective layer 5 is set preferably to a range of 1 to 10 nm, because the distance between the magnetic head and the magnetic recording medium can be reduced, from the viewpoint of a high recording density.

Lubricants such as perfluoropolyether, fluorinated alcohol, and fluorinated carboxylic acid can be preferably used for the lubricant film 6.

Magnetic Recording and Reproducing Apparatus

Figure 12:
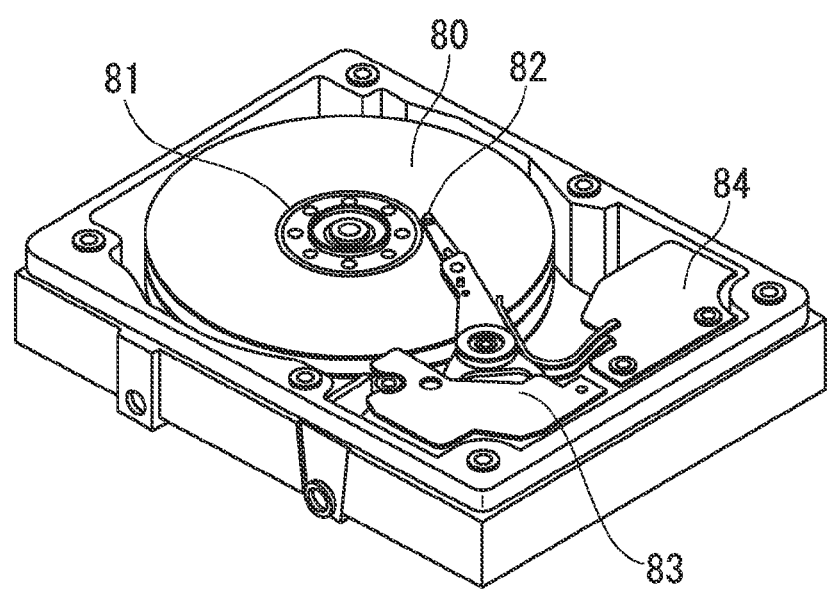
FIG. 12 is a perspective view illustrating an example of a magnetic recording and reproducing apparatus.

FIG. 12 is a diagram illustrating an example of an HDD (magnetic recording and reproducing apparatus) using the magnetic recording medium according to the present invention.

The HDD include a magnetic recording medium 80 according to the present invention shown in FIG. 11, a medium driving unit 81 rotationally driving the magnetic recording medium 80, a magnetic head 82 recording and reproducing information on and from the magnetic recording medium 80, a head driving unit 83 causing the magnetic head 82 to move relative to the magnetic recording medium 80, and a recording and reproduction signal processing system 84.

The recording and reproduction signal processing system 84 can process data input from the outside, send a recording signal to the magnetic head 82, process a reproduction signal from the magnetic head 82, and send data to the outside.

A magnetic head, which has a GMR device using a great magnetic resistance effect (GMR) as a reproduction device, suitable for a higher recording density, can be used as the magnetic head 82.

EXAMPLES

Hereinafter, the advantages of the present invention will be described with reference to examples. The invention is not limited to the following examples, but may be appropriately modified without departing from the concept of the present invention.

Example 1

Example 1 used a glass substrate (TS-10SX, made by Ohara Inc.) having a disc shape with an outer diameter of 65 mm, a central hole of 20 mm, and a thickness of 0.80 mm.

A first principal surface grinding step, an inner and outer circumferential end face grinding step, an inner circumferential end face polishing step, a second principal surface grinding step, an outer circumferential end face polishing step, a first principal surface polishing step, and a second principal surface polishing step were sequentially performed in this order on the glass substrate having a disc shape.

Specifically, in the first principal surface grinding step, a lapping machine including a pair of upper and lower platens was used, and both principal surfaces of plural glass substrates having a disc shape were ground through the use of grinding pads disposed in the platens in a state where the plural glass substrates were interposed between the platens rotating in opposite directions.

At this time, a diamond pad (TRIZACT (product name), made by Sumitomo 3M Limited) was used as the grinding pads. In the diamond pad, an outer size of each protrusion had sides of 2.6 mm square, a height of 2 mm, and an inter-protrusion gap of 1 mm, an average particle diameter of diamond polishing particles was 9 μm, the content of diamond polishing particles in the protrusions was about 20 vol %, and an acryl resin was used as a binder. A 4-way double-sided polishing machine (16B type made by Hamai Co., Ltd.) was used as the lapping machine, and a polishing process was performed at a rotating rate of the platens of 25 rpm with a processing pressure of 120 g/cm$^2$ for 15 minutes. A solution prepared by diluting COOLANT D3 (made by Neos Company Limited) to 10 times with water was used as the grinding solution and the amount of one side ground in the glass substrate having a disc shape was set to about 100 μm.

In the inner and outer circumferential end face grinding step, a grinding machine including an inner circumferential whetstone and an outer circumferential whetstone was used, a stacked body, in which plural glass substrates having a disc shape were stacked with spacers interposed therebetween in a state where the central holes thereof were matched with each other, was made to axially rotate, the plural glass substrates having a disc shape were inserted in the diameter direction between the inner circumferential whetstone inserted into the central holes of the glass substrates having a disc shape and the outer circumferential whetstone disposed on the outer circumference of the glass substrates W having a disc shape, and the inner circumferential whetstone and the outer circumferential whetstone were made to rotate in the opposite direction of the rotation of the stacked body to grind the inner circumferential end faces of the glass substrates having a disc shape by the use of the inner circumferential whetstone and to grind the outer circumferential end faces of the glass substrates having a disc shape by the use of the outer circumferential whetstone. At this time, a whetstone including 80 vol % of diamond polishing particles with an average diameter of 10 μm and using nickel alloy as a binder was used as the inner circumferential whetstone and the outer circumferential whetstone. The rotation rate of the inner circumferential whetstone was set to 1200 rpm, the rotation rate of the outer circumferential whetstone was set to 600 rpm, and the grinding operation was carried out for 30 seconds under these conditions.

In the inner circumferential end face polishing step, a polishing machine including an inner circumference polishing brush was used and the inner circumference end faces of the glass substrates having a disc shape were polished by causing the inner circumference polishing brush to move vertically while dropping a polishing solution to the inner circumference polishing brush and while causing the stacked body to axially rotate and causing the inner circumference polishing brush inserted into the central holes of the glass substrates having a disc shape to rotate in the opposite direction of the rotation of the glass substrates having a disc shape. At this time, a nylon brush was used as the inner circumference polishing brush, and a solution prepared by adding a ceria polishing material solution (with an average particle diameter 0.5 μm, made by Showa Denko K.K.) with a solid content of 40 mass % to water so that the ceria content is 1 mass % was used as the polishing solution. The rotation rate of the inner circumference polishing brush was set to 300 rpm and the polishing operation was performed for 10 minutes.

In the second principal surface grinding step, a lapping machine including a pair of upper and lower platens was used, and both principal surfaces of plural glass substrates having a disc shape were ground through the use of grinding pads disposed in the platens in a state where the plural glass substrates were interposed between the platens rotating in the opposite directions. At this time, a diamond pad (TRIZACT (product name), made by Sumitomo 3M Limited) was used as the grinding pads. In the diamond pad, an outer size of each protrusion had sides of 2.6 mm square, a height of 2 mm, and an inter-protrusion gap of 1 mm, an average particle diameter of diamond polishing particles was 0.5 μm, the content of diamond polishing particles in the protrusions was about 60 vol %, and an acryl resin was used as a binder. A 4-way double-sided polishing machine (16B type made by Hamai Co., Ltd.) was used as the lapping machine, and a polishing process was performed at a rotating rate of the platens of 30 rpm with a processing pressure of 100 g/cm$^2$ for 10 minutes. A solution prepared by diluting COOLANT D3 (made by Neos Company Limited) to 10 times with water was used as the grinding solution and the amount of one side ground in the glass substrate having a disc shape was set to about 9 μm.

In the outer circumferential end face polishing step, a polishing machine including an outer circumference polishing brush was used and the outer circumference end faces of the glass substrates having a disc shape were polished by causing the outer circumference polishing brush to move vertically while dropping a polishing solution to the outer circumference polishing brush and while causing the stacked body, in which plural glass substrates having a disc shape were stacked with spacers interposed therebetween in a state where the central holes thereof are matched with each other, to axially rotate by the use of a rotating shaft inserted into the central holes of the glass substrates having a disc shape and causing the outer circumference polishing brush brought into contact with the outer circumferential end faces of the glass substrates having a disc shape to rotate in the opposite direction of the rotation of the stacked body. At this time, a nylon brush was used as the outer circumference polishing brush, and a solution prepared by adding a ceria polishing material solution (with an average particle diameter 0.5 μm, made by Showa Denko K.K.) with a solid content of 40 mass % to water so that the ceria content is 1 mass % was used as the polishing solution. The rotation rate of the outer circumference polishing brush was set to 300 rpm and the polishing operation was performed for 10 minutes.

In the first principal surface polishing step, a polishing machine including a pair of upper and lower platens was used, plural glass substrates having a disc shape were inserted between the platens rotating in the opposite directions, and both principal surfaces of the glass substrates having a disc shape were polished by the use of polishing pads disposed in the platens while dropping a polishing solution to the glass substrates having a disc shape. At this time, a suede type polishing pad (made by Filwel Co., Ltd.) was used as the polishing pads and a solution prepared by adding a ceria polishing material solution (with an average particle diameter 0.2 μm, made by Showa Denko K.K.) with a solid content of 40 mass % to water so that the ceria content was 0.5 mass % was used as the polishing solution.

A 4-way double-sided polishing machine (16B type made by Hamai Co., Ltd.) was used as the polishing machine, and a polishing operation was performed at a rotation rate of the platens of 25 rpm with a processing pressure of 110 g/cm$^2$ for 20 minutes while supplying the polishing solution at 7 liters/minute. The amount of one side polished in each glass substrate having a disc shape was set to about 3 μm.

In the second principal surface polishing step, a polishing machine including a pair of upper and lower platens was used, plural glass substrates having a disc shape were inserted between the platens rotating in the opposite directions, and both principal surfaces of the glass substrates having a disc shape were polished by the use of polishing pads disposed in the platens while dropping a polishing solution to the glass substrates having a disc shape. At this time, a suede type polishing pad (made by Filwel Co., Ltd.) was used as the polishing pads and a polishing slurry prepared by adding a ceria polishing material solution (with an average particle diameter 0.08 μm, made by Showa Denko K.K.) with a solid content of 40 mass % to water so that the ceria content was 0.5 mass % was used as the polishing solution. A 4-way double-sided polishing machine (16B type made by Hamai Co., Ltd.) was used as the polishing machine, and a polishing operation was performed at a rotation rate of the platens of 27 rpm with a processing pressure of 100 g/cm$^2$ for 30 minutes while supplying the polishing solution at 7 liters/minute. The amount of one side polished in each glass substrate having a disc shape was set to about 2 μm.

A chemical cleaning operation and a pure-water cleaning operation using an anionic surfactant along with ultrasonic waves were performed on the resultant glass substrates having a disc shape to manufacture a glass substrate having a disc shape according to Example 1.

Example 2

In Example 2, a glass substrate having a disc shape was manufactured in a manner identical to that of Example 1, except that a polishing operation was performed at a rotation rate of the platens of 27 rpm at a processing pressure of 90 g/cm$^2$ for 30 minutes through the second principal surface grinding step, and the amount of one side polished in the glass substrate having a disc shape was set to about 1.5 μm.

Comparative Example 1

In Comparative Example 1, a comparative glass substrate having a disc shape was manufactured in a manner identical to that of Example 1, except that a grinding operation was performed at a rotation rate of the platens of 25 rpm at a processing pressure of 120 g/cm$^2$ for 10 minutes and the amount of one side polished in the glass substrate having a disc shape was set to about 10 μm in the second principal surface grinding step, and a rotation rate of the platens was set to 25 rpm and a processing pressure was set to 110 g/cm$^2$ in the second principal surface polishing step.

Evaluation of Substrate Surface

Figure 13:
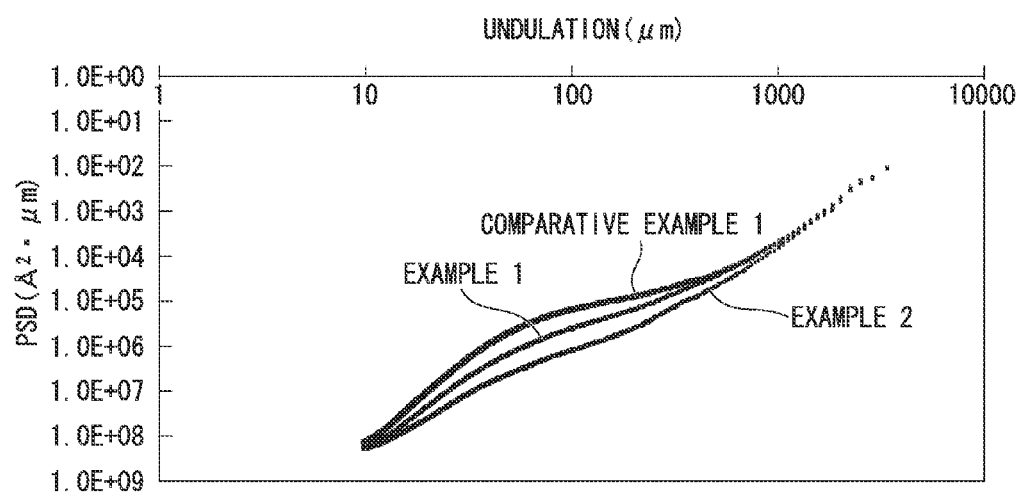
FIG. 13 is a graph illustrating the relationship between the surface roughness Rq and undulation, and the PSD with respect to substrates for a magnetic recording medium according to Examples 1 and 2 and Comparative Example 1.

The relationship between the surface roughness Rq and the undulation and the PSD in the surfaces of the glass substrates having a disc shape according to Examples 1 and 2 and Comparative Example 1 was measured. Candela OSA 6300 (made by KLA-Tencor Corporation, US) was used in the measurement and the measuring conditions were as follows. The measurement results are shown in Table 2 and FIG. 13.

Rotation rate of substrate: 10,000 rpm
Measurement range: radius of 19 to 25 mm, rotation angle of 0° to 360°
Measurement step: 4 μm
Sampling frequency: 5.46°
Laser scanning method: spiral

TABLE 2

|  | Rq (angstrom) | P (%) |
|---|---|---|
| Example 1 | 0.60 | 10% |
| Example 2 | 0.55 | 7% |
| Comparative Example 1 | 0.53 | 22% |

Manufacturing Magnetic Recording Medium

Magnetic recording mediums were manufactured using the glass substrates having a disc shape according to Examples 1 and 2 and Comparative Example 1.

Specifically, a glass substrate having a disc shape was set into a film-forming chamber of a DC magnetron sputtering apparatus (C-3040, made by Canon Anelva Corporation), the film-forming chamber was exhausted until reaching a degree of vacuum of $1 \times 10^{-5}$ Pa, and an adhesion layer with a thickness of 10 nm was formed on the glass substrate using a Cr target. A soft magnetic layer with a thickness of 25 nm was formed on the adhesion layer at a substrate temperature of 100° C. or lower using a target of Co-20Fe-5Zr-5Ta (with Fe content of 20 at %, Zr content of 5 at %, Ta content of 5 at %, and the balance of Co), an Ru layer with a thickness of 0.7 nm was formed thereon, and a soft magnetic layer including Co-20Fe-5Zr-5Ta with a thickness of 25 nm was formed thereon, whereby the resultant was used as a soft magnetic underlayer.

A seed layer with a thickness of 5 nm was formed on the soft magnetic underlayer using a target of Ni-6W (with W content of 6 at % and the balance of Ni), and an Ru layer with a thickness of 10 nm was formed as a first orientation control layer on the seed layer at a sputtering pressure of 0.8 Pa.

As a second orientation control layer, an Ru layer with a thickness of 10 nm was formed thereon at a sputtering pressure of 1.5 Pa. A magnetic layer with a thickness of 9 nm including 91(Co15Cr16Pt)-6($SiO_2$)-3($TiO_2$) (in which the mole concentration of an alloy having Cr content of 15 at %, Pt content of 16 at %, and the balance of Co is 91 mol %, the mole concentration of oxide $SiO_2$ is 6 mol %, and the mole concentration of oxide $TiO_2$ is 3 mol %) was formed on the second orientation control layer at a sputtering pressure of 2 Pa.

A non-magnetic layer with a thickness of 0.3 nm including 88(Co30Cr)-12($TiO_2$) (in which the mole concentration of an alloy having Cr content of 30 at % and the balance of Co is 88 mol % and the mole concentration of oxide $TiO_2$ is 12 mol %) was formed on the magnetic layer and a magnetic layer with a thickness of 6 nm including 92(Co11Cr18Pt)-5($SiO_2$)-3($TiO_2$) (in which the mole concentration of an alloy having Cr content of 11 at %, Pt content of 18 at %, and the balance of Co is 92 mol %, the mole concentration of oxide $SiO_2$ is 5 mol %, and the mole concentration of oxide $TiO_2$ is 3 mol %) was formed thereon at a sputtering pressure of 2 Pa. Thereafter, a non-magnetic layer with a thickness of 0.3 nm formed of Ru was formed on the magnetic layer, and a magnetic layer with a thickness of 7 nm was formed thereon at a sputtering pressure of 0.6 Pa using a target of Co-20Cr-14Pt-3B (with Cr content of 20 at %, Pt content of 14 at %, B content of 3 at %, and the balance of Co).

A protective layer with a thickness of 3 nm was formed thereon through the use of a CVD method and a lubricant film formed of perfluoropolyether was finally formed thereon through the use of a dipping method, whereby a magnetic recording medium was manufactured.

Evaluation of Magnetic Recording Medium

Figure 14:
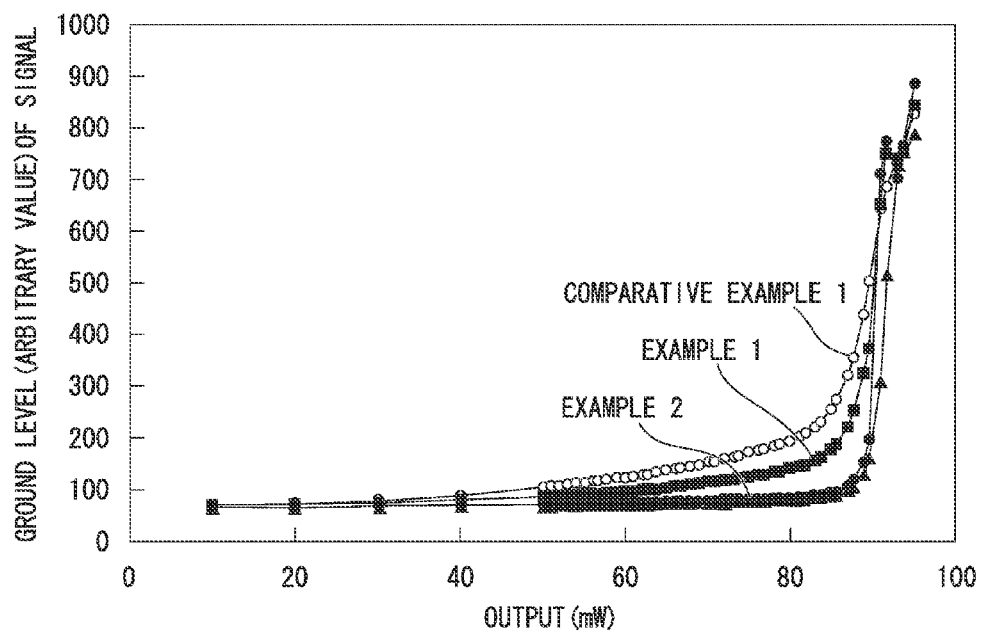
FIG. 14 is a graph illustrating the relationship between power input to a head slider and the ground level of a signal output from a magnetic head with respect to the magnetic recording mediums according to Examples 1 and 2 and Comparative Example 1.

The intensity of the ground level of a signal in the magnetic recording mediums according to Examples 1 and 2 and Comparative Example 1 was evaluated using a magnetic head in which a thermal flying height varying device was formed in a slider of a head. The evaluation conditions were as followed. The evaluation results are shown in FIG. 14. Moreover, in Example 2, two magnetic recording media, which were manufactured in the same conditions, were evaluated.

Rotation rate of substrate: 7,200 rpm
Measurement position: radius of 22.4 mm
Evaluated Head: MR head having thermal flying height varying device
Variation in head flying height: 1 nm/10 mW As shown in FIG. 14, it can be seen in the magnetic recording mediums according to Examples 1 and 2 that the ground level of a signal from the magnetic head just before the magnetic head comes in contact with the surface of the magnetic recording medium is low, the S/N ratio is high, and the electromagnetic conversion characteristic is superior. On the other hand, in the magnetic recording medium according to Comparative Example 1, the intensity of the ground level of a signal was raised to twice or more and the electromagnetic conversion characteristic was poor, just before the magnetic head came in contact with the surface of the magnetic recording medium.

While preferred embodiments of the present invention have been described and illustrated above, it should be understood that these are exemplary examples of the present invention and are not to be considered as limiting. Additions, omissions, substitutions, and other modifications can be made without departing from the spirit or scope of the present invention. Accordingly, the present invention is not to be considered as being limited by the foregoing description, and is only limited by the scope of the appended claims.

What is claimed is:

1. A substrate for a magnetic recording medium having a disc shape with a central hole and having at least a magnetic layer on the surface of the substrate,
   wherein the substrate has a principal surface and a surface roughness of the principal surface of the substrate is 1 angstrom or less in terms of root mean square roughness (Rq) when a space period (L) of an undulation in a circumferential direction is in the range 10 to 1,000 μm, and
   wherein when a component in a vertical axis direction of a line segment Z connecting a point A with the space period (L) of 10 μm and a point B with the space period (L) of 1,000 μm in a curve S marked on a double logarithmic graph which is obtained by analyzing the surface roughness using a spectrum and in which a horizontal axis is set to the space period (L) (μm) and the vertical axis is set to a power spectrum density (PSD) (k·angstrom$^2$·μm) (where k is a constant) is defined as H and a displacement at which the component in the vertical axis direction of the curve S is at a maximum with respect to the line segment Z is defined as ΔH, a value (P) expressed by (ΔH/H)×100(%) is 15% or less.

* * * * *